Dec. 19, 1944.  G. B. GALLASCH  2,365,337
OPTICAL INSTRUMENT
Filed Sept. 30, 1943
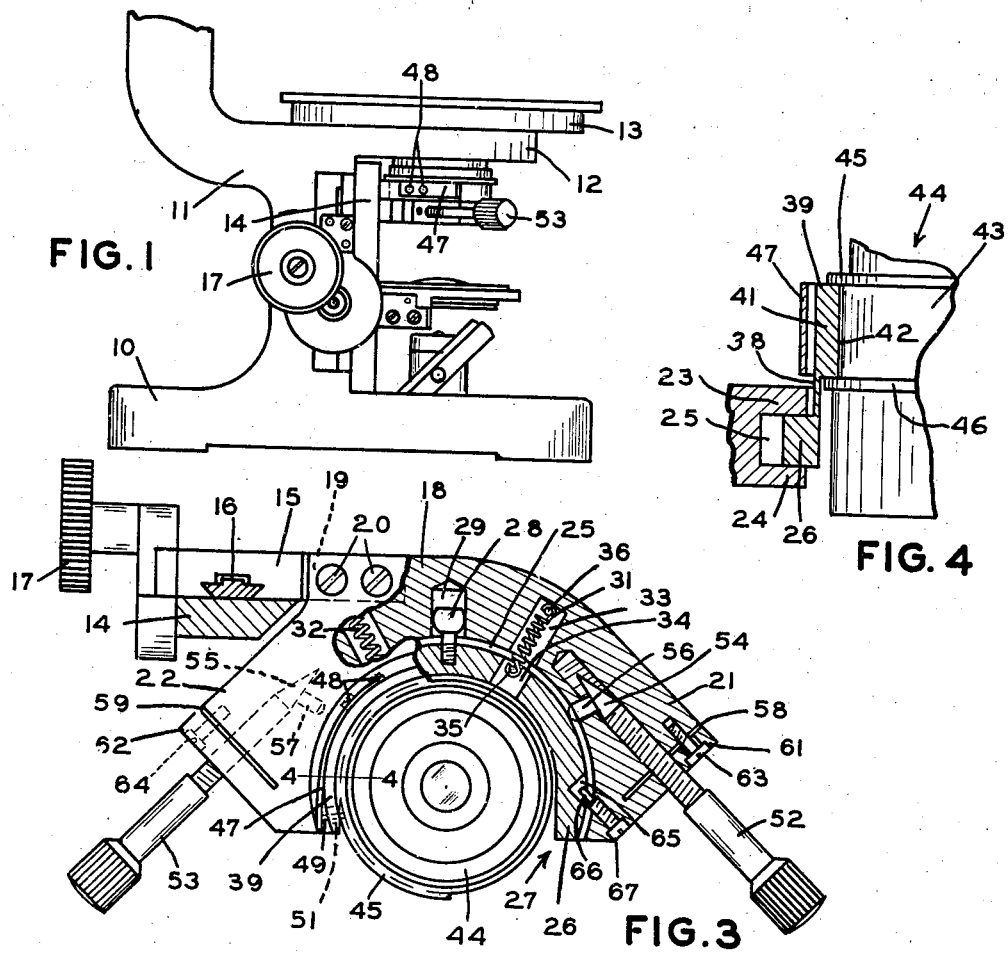
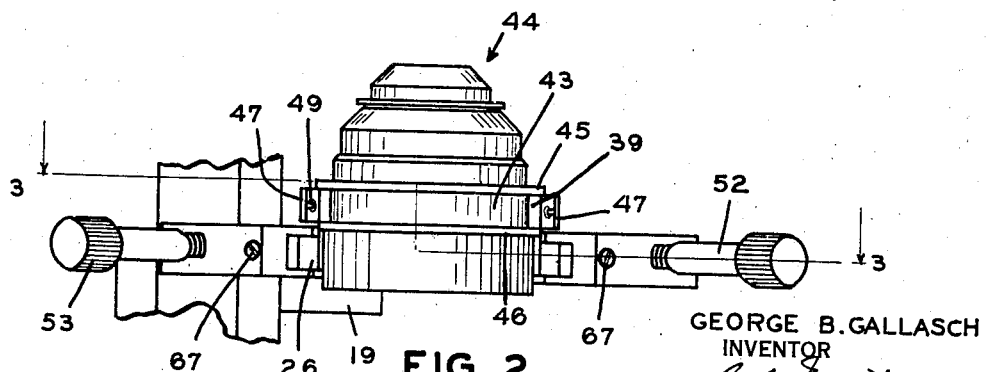
GEORGE B. GALLASCH
INVENTOR
BY
ATTORNEYS Patented Dec. 19, 1944

2,365,337

UNITED STATES PATENT OFFICE 2,365,337

OPTICAL INSTRUMENT

George B. Gallasch, Rochester, N. Y., assignor to Bausch & Lomb Optical Company, Rochester, N. Y., a corporation of New York Application September 30, 1943, Serial No. 504,399

7 Claims. (Cl. 88—40)

This invention relates to optical instruments and more particularly to improvements in substages for microscopes.

In the use of condensers in microscope substages, it is important to accurately position the optical axis of the condenser in alignment with the optical axis of the microscope. Heretofore, in high quality microscopes, the adjustment of the condenser has been effected by screws having very accurately formed fine threads. These screws were not only expensive to manufacture but the threads became worn after a short period of use. The worn threads of the screws materially affected the smooth, positive and minute movements of the condenser necessary to accurately align the optical axis of the condenser with the optical axis of the microscope. Furthermore, after the condenser was accurately adjusted with great difficulty, it often occurred that a slight jar or knock on the microscope or microscope support would cause the displacement of the aligned axes.

It is the object of the present invention to obviate this difficulty in prior substages by providing a substage having cam-actuated means for accurately adjusting the condenser. In the preferred embodiment of the invention, these means comprise pins movably carried by the substage frame, the outer ends of which engage the condenser mount and which are moved relative to the mount by cam surfaces formed on actuators threadedly mounted in the frame of the substage. To position the optical axis of the condenser in alignment with the optical axis of the microscope, the actuators are rotated to axially move the same and cam the pins against the condenser mount to move the condenser carried thereby laterally of the optical axis of the microscope. Although the actuators are threadedly mounted in the substage frame, movement of the condenser is effected by the camming action and threads of moderate pitch can be used and yet bring about the smooth, positive and minute movements of the condenser necessary to quickly and accurately position the optical axis of the condenser in alignment with the optical axis of the microscope.

The substage of the present invention will, therefore, permit the accurate adjustment of the condenser over a greatly extended period of use. Also, by eliminating the necessity of forming the fine threads of the adjusting screws, substantial savings are effected in the manufacturing costs of microscopes.

These and other objects and advantages of the invention reside in certain novel features of construction, arrangement and combination of parts as will hereinafter be more fully explained and pointed out in the appended claims.

Referring to the drawing:

Fig. 1 is a side elevation of the lower portion of a microscope provided with a substage embodying the present invention.

Fig. 2 is a front elevation of the substage embodying the invention, showing the condenser in position.

Fig. 3 is a sectional plan view taken on line 3—3 of Fig. 2.

Fig. 4 is a sectional view taken on line 4—4 of Fig. 3.

One embodiment of my invention is illustrated in the drawing, Fig. 1 of which shows my improved substage illustrated with a microscope of the type shown in U. S. Patent No. 1,862,031, issued June 7, 1932, to W. L. Patterson, wherein 10 indicates a base, 11 represents one of two pillars extending upwardly from the base, and 12 indicates one of two integral forward projections of the pillars for supporting the stage, generally indicated at 13.

The substage of the microscope may be vertically adjusted toward and from the stage 13 in any suitable or desired manner. In the construction shown, the adjusting means includes a fixed guide member 14 which is suitably secured on the pillar 11 of the microscope and in which is slidably mounted a slide member 15, the slide member 15 and the guide member 14 being held in engagement in the usual manner by means of a dovetailed connection 16. The slide member 15 is movable vertically relatively to the guide member 14 by means of the usual rack and pinion (not shown), the pinion being rotatable by the wheel 17. All of these parts have heretofore been used in connection with substages of microscopes and of themselves constitute no part of the invention.

The forked substage frame 18, in the preferred embodiment of the invention, is mounted on a laterally extending arm 19 integral with the slide member 15 and held thereon by two screws 20. The frame 18 is provided with guide means on which a condenser mount may be moved laterally of the optical axis of the microscope. In the particular construction shown, the substage frame 18 has two arms 21 and 22, the interior surface of which is adapted to receive the condenser mount, and for this purpose, is formed semi-circular. The guide means of the substage frame 18 include a pair of internal spaced flanges 23 and 24 defining a groove 25 receiving a rib 26 of the condenser mount.

The condenser mount comprises a substantially semi-circular member 27, the outer periphery of which has a tapped opening for receiving a pivot screw 28 having a semi-spherical head disposed in a bore 29 in the substage frame. The condenser mount is movably held within the groove 25 of the substage frame by two springs 31 and 32. The spring 31 is disposed in aligned bores 33 and 34 within the arm 21 and the member 27, respectively, one end of the spring being attached to a pin 36 in the bore 33 and the other end being attached to a pin 35 in the bore 34. The spring 32 is similarly disposed in aligned bores in the arm 22 and member 27 and attached to the member 27 and arm 22. The resiliency of the springs will continually urge the member 27 against the interior surfaces of the arms 21 and 22.

The member 27 is movably mounted in the substage frame by means of the rib 26 received between the horizontal flanges 23 and 24 of the arms 21 and 22 and spaced from the vertical wall of the groove 25. Extending upwardly from the rib 26 is a wall 38, spaced from the periphery of the flange 23, and connecting the rib 26 with the upper semi-circular condenser-receiving portion 39. This portion is formed to provide an internal rib 41 having a face 42 engaging an annular outer face 43 of the condenser 44.

To maintain the faces of the rib 41 and condenser 44 in engagement and to prevent vertical movement of the condenser, a horizontal annular flange 45 of the condenser engages the upper surface of the rib 41 and a horizontal flange 46 engages the bottom surface of the rib 41, the diameter of the flange 46 being reduced to permit its engagement with the inner semi-circular surface of the wall 38.

To securely hold the condenser within the portion 39, each of two spring leaves 47, secured to the outer periphery of the arms of the portion 39 by screws 48, are provided with a pin 49 disposed in an opening 51 in the portion 39 and engaging the free annular outer face 43 of the condenser 44. The inherent resiliency of the spring leaves 47 will maintain sufficient pressure on the pins 49 to prevent the disengagement of the condenser from the portion 39 during the movement of the member 27, yet will yield readily when it is desired to insert or remove the condenser from the member 27.

It will be apparent that the condenser 44 may be readily mounted in the member 27 and securely held therein by pushing the condenser laterally between the arms of the member 27 to thereby engage the outer annular face 43 of the condenser with the semi-circular rib 41 and the flanges 45 and 46 of the condenser engaging the top and bottom surfaces of the rib 41, the pins 49 receding to allow the passage of the condenser and advancing to securely hold the condenser within the member 27. Also, as the peripheral face of the rib 26 and wall 38 of the member 27 are spaced from the wall of the groove 25 and the periphery of the flange 23, respectively, of the frame 18, the member 27 may be moved to adjust the condenser laterally of the optical axis of the microscope to position the optical axis of the condenser in alignment with the optical axis of the microscope.

The means for effecting this adjustment of the condenser comprises two actuators or thumbscrews 52 and 53 threaded into the arms 21 and 22, respectively, and terminating in conical-shaped cam surfaces 54 and 55 adapted to engage the follower surfaces of pins 56 and 57, respectively. Each of the pins 56 and 57 is movably mounted in their respective arms 21 and 22 with the outer end thereof engaging the periphery of the rib 26.

The conical surface of each thumbscrew and the follower surface of each pin are so formed that, upon inward movement of the thumbscrews, smooth axial movement of the pins is effected. Also, the conical surface of each thumbscrew is so formed relative to the longitudinal axis of the thumbscrew that considerable movement of the thumbscrew must be had to effect a minute movement of the pin. This permits threads of moderate pitch to be formed on the thumbscrews which heretofore have been formed with very accurately formed fine threads and which were expensive to manufacture. By eliminating the necessity of forming the fine threads of the adjusting thumbscrews, substantial savings are effected in the manufacturing costs of microscopes.

If the thumbscrews should become worn, means are provided in the present invention for removing the attendant play occasioned thereby. For this purpose, the two arms 21 and 22 have slots 58 and 59, respectively, extending transversely of the thumbscrews 52 and 53, the end portions of the arms forming clamping members 61 and 62. Disposed within openings in the members 61 and 62 and threaded into tapped openings in the arms 21 and 22 are two screws 63 and 64, respectively. Upon inward movement of the screws, each of the members 61 and 62 will exert a clamping action on the threads of each of the thumbscrews 52 and 53 to thereby firmly hold the thumbscrews in their respective arms of the frame.

From the foregoing, it will be apparent that when the thumbscrew 52 is moved inwardly and the thumbscrew 53 is moved outwardly, the conical surface of the thumbscrew 52 will cam the pin 56 against the rib 26 to move the member 27 about the pivot established by the screw 28 against the action of the spring 31. Similarly, when the directions of movement of the thumbscrews are reversed, the conical surface of thumbscrew 53 will cam the pin 57 against the rib 26 and the member 27 will be moved in an arcuate path in the opposite direction against the action of the spring 32. Also, when the thumbscrews are simultaneously moved in the same direction, the member 27 and the condenser 44 will be moved in a path substantially coincident with the axis of the screw 28, the direction of movement being dependent on the direction of rotation of the thumbscrews.

To prevent excessive tension on the springs 31 and 32 and to retain the member 27 within the substage, stop means are provided in the substage for limiting the outward movement of the member 27. For this purpose, the member 27 has a notch 65 disposed in each peripheral end portion of its arms receiving a retaining pin 66 formed on the end of a screw 67 threaded into each arm of the substage frame. The extent of the outward movement of the member 27 will be limited by the pins 66 of the substage to thereby retain the member 27 within the substage frame and within the limits of elasticity of either or both of the springs. Sufficient space exists between the notches and pins to permit the member 27 to be actuated in its respective paths of movement necessary to position the condenser 44 with its optical axis in alignment with the optical axis of the microscope.

Hence it will be apparent that I have provided an improved substage having means for producing lateral movement of the condenser relative to the optical axis of the microscope to position the optical axis of the condenser in alignment with the optical axis of the microscope. The movement can be effected in minute amounts and the action is smooth and positive. The operating handles of the thumbscrews are located in the front of the substage and therefore may be conveniently operated by the microscopist. The operating screws are formed with threads of moderate pitch which permits a substantial saving to be effected in the manufacturing costs of microscopes. Should the threads of the screws become worn, a clamping action may be exerted on the screws to correct the play resulting therefrom. The substage of the present invention permits substage parts, such as condensers and iris diaphragms, to be readily removed and replaced by a lateral movement with reference to the optical axis of the microscope, thus permitting the quick and easy interchange of substage parts in the substage.

Various modifications can obviously be made without departing from the spirit of my invention as pointed out in the appended claims.

I claim:

1. A microscope substage comprising a frame which is adjustable in a direction parallel with the optical axis of the microscope; a supporting member carried by said frame for lateral movement relative to the optical axis of the microscope; a substage part carried by said member; resilient means connecting said member with said frame; pivot means carried by said member and engaging said frame, said pivot means disposed intermediate said resilient means; a follower movably mounted on said frame on opposite sides of said resilient means, each follower engaging said supporting member; and cam means carried by said frame for moving said followers to adjust the position of said supporting member against the action of said resilient means and about said pivot means relatively to said frame to position said substage part relative to the optical axis of the microscope.

2. A microscope substage comprising a member which is adjustable in a direction parallel with the optical axis of the microscope; a supporting member carried within said adjustable member for lateral movement relative to the optical axis of the microscope; a plurality of pins movably mounted in said adjustable member and engaging said supporting member; and cam members movably mounted in said adjustable member and engaging said pins, the actuation of said cam members moving said pins to thereby position said supporting member relative to the optical axis of the microscope.

3. A microscope substage comprising a forked frame which is adjustable in a direction parallel with the optical axis of the microscope; a supporting member carried within said adjustable member for lateral movement relative to the optical axis of the microscope; pivot means carried by said member and engaging said frame; a pin movably carried in each arm of said frame and engaging said member; and a cam member movably mounted in each arm of said frame and engaging said pins, actuation of said cam members moving said pins to thereby move said supporting member about said pivot means and relative to the optical axis of the microscope.

4. A microscope substage comprising a forked frame which is adjustable in a direction parallel with the optical axis of the microscope; guide means carried by said frame and extending transversely to said optical axis; a supporting member cooperating with said guide means for lateral movement relative to the optical axis of the microscope; a substage part carried by said member; resilient means connecting said member with said frame; pivot means disposed intermediate said resilient means and engaging said member with said frame; a pin movably carried in each arm of said frame and engaging the periphery of said supporting member; and a cam member movably mounted in each arm of said frame and engaging one of said pins for moving said supporting member against the action of said resilient means and about said pivot means relatively to said frame to position said substage part relative to the optical axis of the microscope.

5. A microscope substage comprising a forked frame which is adjustable in a direction parallel with the optical axis of the microscope; guide means carried by said frame and extending transversely to said optical axis; a supporting member cooperating with said guide means for lateral movement relative to the optical axis of the microscope; a substage part carried by said member; resilient means connecting said member with said frame; pivot means disposed intermediate said resilient means and engaging said member with said frame; a pin movably carried in each arm of said frame and engaging the periphery of said supporting member; a cam member movably mounted in each arm of said frame and engaging one of said pins for moving said supporting member against the action of said resilient means and about said pivot means relatively to said frame to position said substage part relative to the optical axis of the microscope; and means for limiting the outward movement of said supporting member within said frame.

6. A microscope substage comprising a forked frame which is adjustable in a direction parallel with the optical axis of the microscope; guide means carried by said frame and extending transversely to said optical axis; a substantially semi-circular member cooperating with said guide means for lateral movement relative to the optical axis of the microscope; a substage part carried by said member; pivot means engaging said frame and the periphery of said member; resilient means connecting said member with said frame, said resilient means disposed on opposite sides of said pivot means and drawing said member toward said frame; a pin movably carried in each arm of said frame on opposite sides of said member and engaging the outer periphery of said member; and a cam member movably mounted in each arm of said frame and engaging one of said pins for moving said member against the action of one of said resilient means and about said pivot means to position said substage part relative to the optical axis of the microscope.

7. A microscope substage comprising a forked frame which is adjustable in a direction parallel with the optical axis of the microscope; guide means carried by said frame and extending transversely to said optical axis; a substantially semi-circular member cooperating with said guide means for lateral movement relative to the optical axis of the microscope; a substage part carried by said member; pivot means engaging said frame and the periphery of said member; resilient means connecting said member with said frame, said resilient means disposed on opposite sides of said pivot means and drawing said member toward said frame; a pin movably carried in each arm of said frame on opposite sides of said member and engaging the outer periphery of said member; a member threadedly mounted in each arm of said frame; a conically shaped cam member carried by the inner end of each threadedly mounted member; each cam member engaging an end of a pin; and means for rotating said threadedly mounted members to move said cams along the longitudinal axis of said threadedly mounted members.

GEORGE B. GALLASCH.